United States Patent [19]

Engelskirchen et al.

[11] Patent Number: 5,821,360

[45] Date of Patent: Oct. 13, 1998

[54] FLUIDIZED-BED OXIDATION PROCESS FOR THE PRODUCTION OF POLYSACCHARIDE-BASED POLYCARBOXYLATES

[75] Inventors: Konrad Engelskirchen, Meerbusch; Herbert Fischer; Werner Juettner, both of Duesseldorf; Hans-Wilhelm Verholt, Langenfeld; Thomas Moeller, Duesseldorf, all of Germany

[73] Assignee: Henkel Kommanditgesellschaft auf Aktien, Duesseldorf, Germany

[21] Appl. No.: 687,588

[22] PCT Filed: Jan. 23, 1995

[86] PCT No.: PCT/EP95/00227

§ 371 Date: Jul. 31, 1996

§ 102(e) Date: Jul. 31, 1996

[87] PCT Pub. No.: WO95/20608

PCT Pub. Date: Aug. 3, 1995

[30] Foreign Application Priority Data

Jan. 31, 1994 [DE] Germany ............ 44 02 851.2

[51] Int. Cl.⁶ .............. C07H 13/02; C07H 1/00
[52] U.S. Cl. ............ 536/124; 510/470; 510/471; 536/102; 536/105; 536/119
[58] Field of Search .................. 536/102, 119, 536/105, 124; 510/470, 471

[56] References Cited

U.S. PATENT DOCUMENTS

| | | | |
|---|---|---|---|
| 2,472,590 | 6/1949 | Kenyon et al. | 260/209 |
| 3,740,339 | 6/1973 | MacDonald | 252/135 |
| 3,790,561 | 2/1974 | MacDonald | 260/212 |
| 3,967,975 | 7/1976 | Idaszak | 127/23 |
| 4,021,927 | 5/1977 | Idaszak | 34/10 |
| 4,820,439 | 4/1989 | Rieck | 252/135 |
| 5,541,316 | 7/1996 | Engelskirchen et al. | 510/471 |

FOREIGN PATENT DOCUMENTS

| | | |
|---|---|---|
| 051 147 | 5/1982 | European Pat. Off. . |
| 164 514 | 12/1985 | European Pat. Off. . |
| 2 291 788 | 6/1976 | France . |
| 2 412 837 | 3/1974 | Germany . |
| 4203923 | 8/1993 | Germany . |
| 78 087 | 5/1955 | Netherlands . |
| 70 02 500 | 2/1970 | Netherlands . |
| WO 93/16110 | 8/1993 | WIPO . |

OTHER PUBLICATIONS

Houbel–Weyl "Methoden der organischen Chemie", Thieme–Verlag, Stuttgart (1987), vol. E 20, Makromolekulare Stoffe, Sub–chapter Polysaccharid–Derivate (Polysaccharide Derivatives), by Dr. K. Engelskirchen, loc. cit., p. 2042 et seq., more especially p. 2124 et seq. (Oxidation Products of Cellulose) and p. 2166 et seq. (Oxidized Starches).

Cellulose Chemistry and its Applications (1983), John Wiley & Sons, Chichester, GB, "Oxidation of Cellulose"(Chapter 101.) P. Nevell, and the extensive literature cited therein, loc. cit. pp. 262–265.

Beranek/Rose/Winterstein, Gundlagen der Wirbelschichttechnik, Krauskopf–Verlag, 1975, p. 72. (Figure only).

*The Carbohydrates* ed. by Ward Pigman. Academic Press, Inc., pp. 354–355, 1957.

*Primary Examiner*—Marian C. Knode
*Assistant Examiner*—Howard C. Lee
*Attorney, Agent, or Firm*—Ernest G. Szoke; Wayne C. Jaeschke; Daniel S. Ortiz

[57] ABSTRACT

A process for producing polycarboxylic acids or their salts from polysaccharides is provided. Solid particulate polysaccharides having at least one primary alcohol group in the polysaccharides are oxidized with nitrogen dioxide in a fluid bed. The fluidizing gas contains nitrogen dioxide and the process is operated at a pressure of from 0.5 to 12 bars and a temperature between the boiling point of nitrogen dioxide and 160° C. At least two moles of nitrogen dioxide for the equivalent of the primary alcohol groups reacted over the entire reaction are provided.

20 Claims, 1 Drawing Sheet

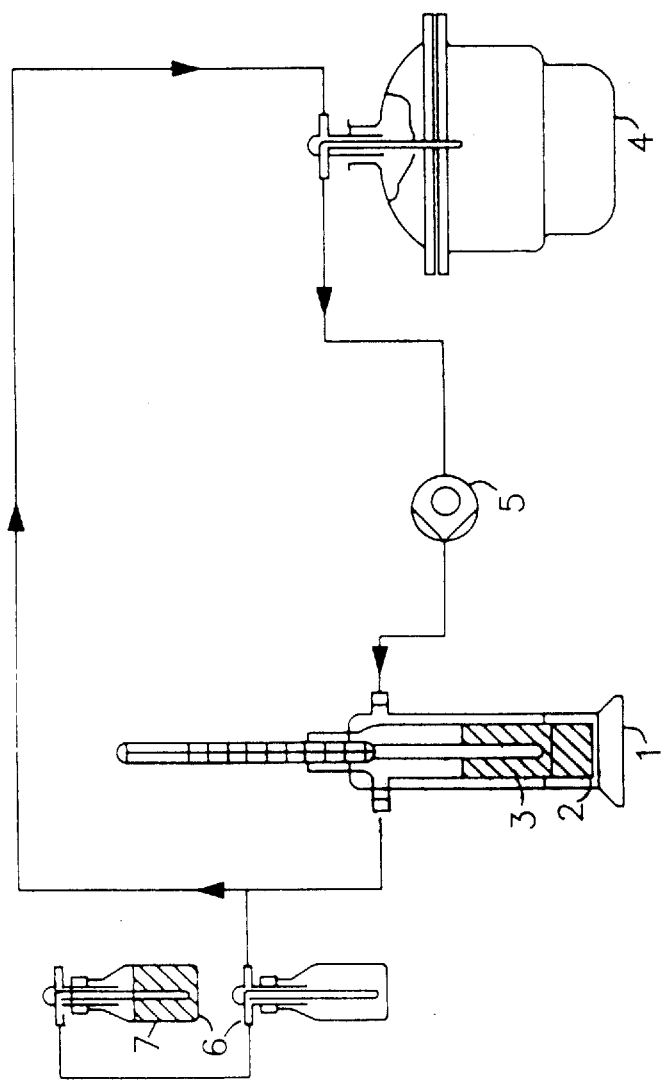

FLUIDIZED-BED OXIDATION PROCESS FOR THE PRODUCTION OF POLYSACCHARIDE-BASED POLYCARBOXYLATES

This application is a 371 of PCT/EP 95/00227 filed on 23 Jan. 1995.

FIELD OF THE INVENTION

This invention relates to a process for the production of polycarboxylates by selective oxidation of polysaccharides with nitrogen dioxide in a fluidized-bed.

RELATED ART

The production of polycarboxylates by oxidative treatment of polysaccharides, for example cellulose, starch and dextrins, is widely known, cf. for example Houben-Weyl "Methoden der organischen Chemie", Thieme-Verlag, Stuttgart (1987), Vol. E 20, Makromolekulare Stoffe, Subchapter "Polysaccharid-Derivate (Polysaccharide Derivatives)", by Dr. K. Engelskirchen, loc. cit., pages 2042 et seq., more especially pages 2124 et seq. (Oxidation Products of Cellulose) and pages 2166 et seq. (Oxidized Starches), and "Cellulose Chemistry and its Applications" (1983), John Wiley & Sons, Chichester, GB, more particularly T. P. Nevell, "Oxidation of Cellulose" (Chapter 10) and the extensive literature cited therein, loc. cit., pages 262 to 265.

Broadly speaking, it may be said that there are various oxidizing agents for the oxidation of polysaccharides, more especially polyglucosans synthesized solely from glucose. They include, for example, (atmospheric) oxygen, hydrogen peroxide, sodium hypochlorite or bromite, periodic acid or periodates, lead(IV) acetate, nitrogen dioxide and cerium (IV) salts. These oxidizing agents react very differently with the anhydroglucose units, cf. for example the formula schemes in Houben-Weyl, loc. cit. Pages 2124. For example, periodates or lead(IV) acetate promote C-C cleavage of the anhydroglucose rings. So-called 2,3-dialdehyde cellulose is obtained from cellulose, dialdehyde starch being similarly obtained from starch. It is also known that, where nitrogen dioxide is exposed to the action of cellulose, oxidation of the primary alcohol group to the carboxyl group is by far the predominant reaction. The oxidizing agent, generally present in equilibrium with dinitrogen tetroxide, may be used in gaseous form or in the form of a solution in an inert organic solvent, cf. also Houben-Weyl, loc. cit., page 2125 and the primary literature cited in this connection therein. Starting out from starch also, the primary alcohol group of the anhydroglucose units can be oxidized substantially selectively to the carboxyl group. Thus, the oxidation of starch with gaseous nitrogen dioxide or with nitrogen dioxide dissolved in water or in various organic solvents at room temperature and normal pressure is known from U.S. Pat. No. 2,472,590. Under these conditions, substantially complete conversion of the primary alcohol groups of the polysaccharides into carboxyl groups is only achieved after very long reaction times which, in some cases, can be as long as several days. In addition, large quantities of nitrogen dioxide, based on the polysaccharide to be oxidized, are required in the known processes.

Processes for the production of polycarboxylates by oxidation of polysaccharides with gaseous nitrogen dioxide, which may be carried out in the absence of suspending agents or solvents, are known from International patent application WO 93/16110. The same can also apply to a fluidized-bed process although this does involve the use of intensive mixers. The problem addressed by the present invention was to provide a fluidized-bed oxidation process for polysaccharides which would give oxidation products of consistent quality in a technically dependable manner because the polycarboxylates formed would be potentially suitable as builder or co-builder components for detergents. The same also applies to the salts of such polycarboxylates, more particularly their water-soluble salts, because the use of oxidized polysaccharide compounds for boosting the performance of detergents and/or cleaning compositions has basically been known for decades and has been repeatedly investigated, cf. for example Dutch patents NL 69 883 and NL 78 087. The replacement of phosphate-based builder systems by 6-carboxycellulose treated with Lewis acids is described in U.S. Pat. No. 3,740,339 and in U.S. Pat. No. 3,790,561. Dutch patent application NL 70/02 500 also seeks to use oxidized polysaccharide derivatives as a builder system for enhancing the washing power of, above all laundry detergents.

BRIEF DESCRIPTION OF THE INVENTION

The teaching according to the invention is based on the surprising observation that polycarboxylates can be inexpensively obtained in high yields from polysaccharides by a simple process providing the oxidation reaction is carried out in a fluidized bed with a fluidizing medium containing gaseous nitrogen dioxide under certain temperature and pressure conditions. The expression "gaseous nitrogen dioxide" also encompasses the equilibrium mixture of nitrogen dioxide and its dimer dinitrogen tetroxide present under the particular reaction conditions. However, quantities mentioned in reference to nitrogen dioxide are the quantities present in the event of theoretically complete displacement of the nitrogen dioxide/dinitrogen tetroxide equilibrium to the nitrogen dioxide side.

Accordingly, the present invention relates to a process for the production of polycarboxylic acids or salts thereof from polysaccharides by conversion of at least part, preferably at least 15% and more preferably 25% to 100%, of the primary alcohol groups of the polysaccharides into carboxyl groups and optionally at least partial neutralization of the carboxylic acid groups formed by oxidation in a fluidized bed of which the fluidizing medium is a gas containing nitrogen dioxide, characterized in that the reaction is carried out under pressures of 0.5 bar to 12 bar and at a temperature in the range from the boiling point of the nitrogen dioxide under the particular pressure to 160° C. and in that nitrogen dioxide is used in a quantity of at least 2 mole equivalents, based on the alcohol groups to be oxidized and totalled over the reaction time.

BRIEF DESCRIPTION OF THE DRAWING

The DRAWING is a schematic representation of a process of the invention.

DETAILED DESCRIPTION OF THE INVENTION

In the context of the invention, a fluidized bed is understood—without being confined to this method of production—to be the phenomenon which is observed when gases known as fluidizing media flow from below through fine-particle loose material arranged on horizontal perforated plates, cf. the book by D. Kunii and O. Levenspiel, Fluidization Engineering, Butterworth-Heinemann, 2nd Edition, 1991, more particularly the Table on pages 8 and 9 and Chapter 3. A useful reactor for the process according to the invention is also the reactor disclosed in EP 051 147 B1 (FIG. 1), in which a gas-fluidized bed is accommodated in a cylinder in which rotates a shaft equipped with stirring arms. It is also possible to use a reactor with a multistage fluidized bed of the type described in Beránek/Rose/Winterstein, Gundlagen der Wirbelschichttechnik, Krauskopf-Verlag, 1975, page 72. The reaction may readily be carried out continuously in a reactor of this type.

After flowing through the polysaccharide, the fluidizing medium may leave the reaction system although it is preferably circulated. If, in cases where the fluidizing medium is circulated, sufficient quantities of nitrogen dioxide have not been introduced into the reaction system from the outset, nitrogen dioxide may be subsequently introduced into the circuit, preferably as a function of its consumption. Totalled over the reaction time, nitrogen dioxide is present in the reaction system preferably in a quantity of 3 mole equivalents to 50 mole equivalents and more preferably in a quantity of 4 mole equivalents to 20 mole equivalents, based on the alcohol groups to be oxidized. In general, the primary alcohol groups are completely converted into carboxyl groups in 2 to 3 hours where nitrogen dioxide is used. However, where the reaction is carried out on the above-mentioned principle of the stirred fixed bed, the nitrogen dioxide may also be used in quantities below the mole-equivalent quantities mentioned above, i.e. in quantities of down to 2 mole equivalents.

The concentration of the nitrogen dioxide in the fluidizing medium is not critical. In one extreme case, the entire fluidizing medium may consist of nitrogen dioxide. In the other extreme case, a single molecule of nitrogen dioxide is theoretically sufficient to carry out the required reaction on any scale providing it is circulated and re-oxidized in the process after its reaction with the polysaccharide. Re-oxidation may be carried out in a second reaction zone of the circulation system, for example by passing the fluidizing medium through a particulate, solid oxygen-transferring oxidizing agent absorbed onto a solid support or dissolved in liquids. For example, re-oxidation can be carried out using a $V_2O_5$ catalyst which may be regenerated with oxygen. Re-oxidation may also be carried out in situ by addition of a gaseous oxygen-transferring oxidizing agent, more especially oxygen and/or ozone, to the fluidizing medium.

In cases where the fluidizing medium does not consist solely of nitrogen dioxide, it contains gaseous oxygen-transferring oxidizing agent to regenerate the nitrogen dioxide and/or inert gas. Suitable inert gases, i.e. gases which do not react under the particular process conditions required, include noble gases, such as helium or argon, and carbon dioxide, but especially nitrogen, and also mixtures of such gases. The presence of nitrogen oxides which do not significantly affect the intended oxidation reaction, such as nitrogen monoxide and dinitrogen dioxide, is also possible. The concentration of nitrogen dioxide in fluidizing media such as these is preferably from 10% by volume to 98% by volume and more preferably from 20% by volume to 90% by volume. These concentrations apply in particular where the process is carried out under normal pressure. The flow rate of the fluidizing medium has to be selected in such a way that a fluidized bed of the polysaccharide is formed and is preferably of the order of 2 to 10 liters per hour per cm² of the plate above which the fluidized bed is formed. If, in one embodiment of the process according to the invention where the fluidizing medium is circulated, the quantity of nitrogen dioxide simultaneously present is below the above-mentioned minimum quantity totalled over the reaction time, gaseous oxygen-transferring oxidizing agent is preferably used to regenerate the nitrogen dioxide. Mixtures of inert gas with oxygen are preferably used for this purpose, the oxygen content in the gas mixture being from 1% by volume to 30% by volume and, more particularly, from 3% by volume to 10% by volume. In one preferred embodiment of the process according to the invention, oxygen is introduced through the addition of air. The gaseous oxygen-transferring oxidizing agent may be introduced into the circulated gas in its entirety at the beginning of or before the reaction or may be added continuously or in portions according to the amount consumed by regeneration of the nitrogen dioxide.

For a given polysaccharide and nitrogen dioxide content in the fluidizing medium, the necessary reaction time is essentially determined by the required degree of oxidation and by the temperature. The following figures may serve as a guide: at a temperature of 50° C. and under normal pressure using 12 mole equivalents of nitrogen dioxide per hour, based on the hydroxyl groups to be oxidized, 18 to 22% of the primary alcohol groups are converted into carboxyl groups after 30 minutes, 60 to 70% after 60 minutes and 85 to 95% after 1.5 hours.

Several fluidized-bed reactors may be arranged in tandem so that, after leaving the first reactor, the fluidizing medium containing nitrogen dioxide flows through one or more following reactors, optionally with introduction of more nitrogen dioxide. In this particular embodiment, fluidized-bed reactors preferably alternate with stations for re-oxidation of the nitrogen dioxide.

The process according to the invention is preferably carried out under a pressure of 0.8 bar to 9 bar and more preferably under a pressure of 1 bar to 3 bar.

The nature of the polysaccharide used is largely unimportant to the process according to the invention. The only requirement is that it should contain carbohydrate units with primary alcohol groups and should be present in a form which allows the development of a fluidized bed, more particularly in powder form. Suitable polysaccharides are native polyglucans, more especially starch and/or cellulose, and also other polysaccharides, for example polygalactomannans, such as guarane and carubin. The polysaccharides may also be used in chemically or physically modified form providing they still contain oxidizable primary alcohol groups. By virtue of the particularly smooth reaction with these primary alcohol groups and also for economic reasons, starches of various origin, more particularly potato starch, wheat starch, corn starch and/or tapioca starch, which are commercially available in powder form, are preferred. Since cellulose often presents problems in regard to the formation of a fluidized bed on account of its fibrous character, it is preferably used in the form of a micropowder.

The oxidation reaction on which the process according to the invention is based is carried out in particular using the polyglucans mentioned, preferably over such a period that, on a statistical average, at least 15 mole-% of the oxidation product consists of oxidized anhydroglucose units corresponding to formula I:

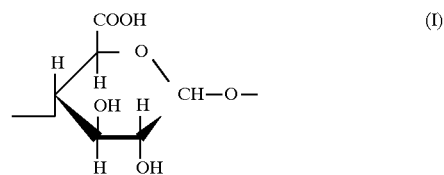

which corresponds to a carboxyl group content of at least 4% by weight.

One process according to the invention gives polyglucan-based polycarboxylates which contain the oxidized anhydroglucose units corresponding in particular to formula I preferably in a quantity of at least 25 mole-% and more preferably in a quantity of at least 35 mole-% in the molecule, another advantage being that there are no significant quantities of other secondary oxidation products. The upper limit to the content of units corresponding to formula I is at 100 mole-% and, more particularly, at around 95 mole-%. Polycarboxylates containing units corresponding to formula I in quantities of 70 mole-% to 100 mole-%, corresponding to a carboxyl group content of up to about 25% by weight, are preferably produced by the process according to the invention.

In case the polysaccharide to be oxidized tends to agglomerate and to form the channels so undesirable in fluidized-bed technology, its flow behavior can be significantly improved by the addition of small quantities of, in particular, solid additives, including for example magnesium oxide, calcium fluoride, calcium phosphate or silica gel, more particularly the silicon dioxide marketed under the name of Aerosil®. Significant effects in this regard are even achieved with only small quantities of additive of, preferably, 0.1% by weight to 5% by weight and, more preferably, 0.25% by weight to 1% by weight, based on the polysaccharide to be oxidized. The polysaccharide used preferably contains no more than 15% by weight and, more particularly, no more than 10% by weight of water.

The embodiment of the process according to the invention in which the fluidizing medium is circulated is illustrated in FIG. 1 which shows a temperature-controlled reactor (1) provided with a filter plate (2) in which the polysaccharide (3) to be oxidized is accommodated. The fluidizing medium containing nitrogen dioxide is pumped through the reactor (1) from a storage vessel (4) and back again in a circuit by a pump (5). Pressure-equalizing bottles (6), which maintain the required reaction pressure by means of a sealing liquid (7), may be placed in the fluidizing medium circuit, for example following the reactor (1). A heated gas outlet is advantageously present to avoid the condensation of water in the reactor.

After the oxidation reaction, the reaction mixture may be taken up in water, purified by washing with water and filtration and isolated in solid form. A considerable proportion of the nitrogen oxides present in the reaction system at the end of the reaction may be removed by degassing processes. Thus, a simple vacuum treatment of the reaction mixture generally leads to products with acceptably low nitrite and nitrate contents without any need for washing with water.

After the oxidation reaction and working up, if any, the carboxyl groups of the oxidation product may be at least partly neutralized by treatment with a basic reagent, i.e. converted from the acid into the salt form. An aqueous solution containing alkali metal hydroxide, ammonium hydroxide and/or organic base is preferably used as the neutralizing agent. Neutralization may also be carried out immediately after the oxidation reaction, for example by purging the reaction vessel with gaseous ammonia. Salt formation may also be carried out under reducing conditions, for example using sodium borohydride. The neutralizing agent is preferably used in such quantities that all the carboxyl groups of the oxidation product are converted into the salt form. The oxidation product may be added to the neutralizing agent or vice versa. Salt formation may even be carried out under the conditions where the polycarboxylates are used or further processed in their acid form, for example in the production or use of detergents or cleaners by typical alkaline components thereof.

The polycarboxylates produced by the process according to the invention are preferably used as builders or co-builders in detergents or cleaners. In formulations such as these, they are preferably used as co-builders in quantities of 0.5% by weight to 10% by weight and, more particularly, in quantities of 2% by weight to 7% by weight, based on the total weight of the formulation containing inorganic builders as principal builders. They are used with particular preference in corresponding formulations which contain zeolite NaA, as described for example in connection with laundry detergents in DE 24 12 837, and/or the layer silicates described in European patent application EP 164 514 as principal builders and polycarboxylic acids produced in accordance with the invention or salts thereof in quantity ratios of 2:1 to 5:1. The composition of the detergents and/or cleaners may otherwise be selected virtually as required within the limits of known formulations.

EXAMPLES

Example 1

Starch (3) was oxidized in the reactor illustrated in FIG. 1. 67.5 parts by weight of potato starch, moisture content 4% by weight, were mixed with 0.5% by weight of Aerosil® and introduced into the reactor (1) (height 60 cm, diameter 40 mm). The storage vessel (4) contained 50 parts by weight of $N_2O_4/NO_2$ (equilibrium mixture at room temperature). From the gas space of the storage vessel, nitrogen dioxide was pumped back through the starch into the storage vessel by a pump (5) at a rate sufficient for fluidization. By immersing the reactor (1) in a heating bath, the temperature in the fluidized bed was adjusted to 50° C. The nitrogen dioxide was circulated for 5 hours at that temperature. The hose connections between the reactor (1) and the storage vessel (4) and between the pump (5) and the storage vessel (4) were then undone. Air was then passed through the oxidation product by the pump (5) to cool the reaction product and to blow out nitrogen oxides. The product was washed with water until free from nitrite and nitrate, subsequently freed from water and then dried in vacuo at 50° C. A polycarboxylic acid was obtained in the form of a white free-flowing powder. To determine the acid value, the polycarboxylic acid was dissolved in excess ethanolic potassium hydroxide and, after 20 hours, the excess hydroxide was back-titrated with hydrochloric acid. The acid value is expressed in milligrams of KOH per gram of polysaccharide oxidate. The product had an acid value of 260 which corresponds to an average content of around 0.8 carboxyl groups per anhydroglucose unit.

Example 2

The reactor of Example 1 was connected on the gas inlet side to a storage vessel for liquid dinitrogen dioxide and, on the gas outlet side, to two cold traps arranged in tandem which were cooled with a refrigerating mixture of carbon dioxide and acetone. The reactor was charged with a mixture of 60 parts by weight of potato starch and 0.6 part by weight of Aerosil®. 100 Parts by weight of liquid dinitrogen tetroxide were introduced into the storage vessel. Through the gas space of the storage vessel cooled with ice water, air was passed into the reactor at a flow rate sufficient to fluidize the starch, becoming enriched with nitrogen dioxide in the process. Unreacted nitrogen dioxide was condensed out from the gas stream leaving the reactor in the cold traps. The fluidized starch was heated to 50° C. by external heating of the reactor. The gas stream was passed through the fluidized bed for 5 hours at that temperature, followed by working up as described in Example 1. The product obtained in the form of a white powder had an acid value of 154, corresponding to an average content of around 0.46 carboxyl groups per anhydroglucose unit.

Example 3

Oxidation of the starch was carried out in a cylindrical glass apparatus which was provided with a porous base plate permeable to gases and which, for the supply or dissipation of heat, was surrounded by a second jacket through which a heating/cooling medium could be pumped. 51.4 Parts by weight of wheat starch with a water content of 5% by weight were mixed with 1% by weight of Aerosil and the resulting mixture introduced into the reactor. Nitrogen was passed through the starch at a flow rate sufficient for fluidization, the starch being heated to a temperature of 48° C. An $NO_2/N_2O_4$ gas stream was then passed through the fluidized bed at a flow rate of 50 parts by volume per hour, the nitrogen flow rate being reduced to 5 parts by volume per hour. The reaction temperature was adjusted to 50° C. After 2 hours, the introduction of $NO_2/N_2O_4$ was stopped and nitrogen oxides were driven out from the oxidized starch by a stream of nitrogen. The crude product was worked up as described in Example 1. The product had an acid value of 334, corresponding to an average content of around 1.04 carboxyl groups per anyhydroglucose unit.

Examples 4 to 9

As described in Example 3, starch was oxidized and worked up under the conditions described in the following Table which also shows the content of carboxyl groups characterized by the acid value as a function of the reaction time.

| No. | Starch [g] | Temperature [°C.] | $NO_2$ [l/h] | $N_2$ [l/h] | Time [mins.] | Acid value |
|---|---|---|---|---|---|---|
| 4 | 51.4 | 50 | 60 | — | 40 | 95 |
|   |      |    |    |    | 70 | 190 |
|   |      |    |    |    | 100 | 260 |
|   |      |    |    |    | 130 | 310 |
|   |      |    |    |    | 160 | 329 |
|   |      |    |    |    | 190 | 359 |
| 5 | 51.4 | 50 | 50 | 5 | 40 | 56 |
|   |      |    |    |    | 100 | — |
|   |      |    |    |    | 130 | 334 |
|   |      |    |    |    | 160 | — |
|   |      |    |    |    | 190 | 373 |
|   |      |    |    |    | 220 | 388 |
| 6 | 50.9 | 50 | 50 | 5 | 35 | 64 |
|   |      |    |    |    | 65 | 210 |
|   |      |    |    |    | 95 | 284 |
|   |      |    |    |    | 125 | 335 |
|   |      |    |    |    | 180 | 360 |
| 7 | 50.9 | 50 | 40 | 20 | 40 | 19 |
|   |      |    |    |    | 70 | 60 |
|   |      |    |    |    | 100 | 140 |
|   |      |    |    |    | 130 | 219 |
|   |      |    |    |    | 160 | 284 |
|   |      |    |    |    | 190 | 313 |
| 8 | 101.8 | 50 | 40 | 10 | 55 | 26 |
|   |      |    |    |    | 85 | 168 |
|   |      |    |    |    | 115 | 244 |
|   |      |    |    |    | 145 | 297 |
|   |      |    |    |    | 190 | 320 |
| 9 | 50.9 | 50 | 20 | 4 | 24 | 6 |
|   |      |    |    |    | 54 | 78 |
|   |      |    |    |    | 84 | 198 |
|   |      |    |    |    | 114 | 268 |
|   |      |    |    |    | 144 | 318 |
|   |      |    |    |    | 200 | 330 |

LIST OF REFERENCE NUMERALS

1 Reactor
2 Filter plate
3 Polysaccharide
4 Storage vessel
5 Pump
6 Pressure equalization
7 Sealing liquid

We claim:

1. In a process for the production of polycarboxylic acids from polysaccharides by conversion of at least part of the primary alcohol groups of the polysaccharides into carboxyl groups under a pressure of 0.5 bar to 12 bar and at a temperature in the range from the boiling point of the nitrogen dioxide under the particular pressure to 160° C. the improvement which comprises: contacting a particulate polysaccharide in a fluidized bed with a gas fluidizing medium containing nitrogen dioxide wherein the nitrogen dioxide is present in a quantity of at least 3 mole equivalents, based on an equivalent of alcohol groups oxidized and totalled over the reaction time.

2. The process as claimed in claim 1, wherein at least 15% of the primary alcohol groups of the polysaccharides are converted into carboxyl groups.

3. The process as claimed in claim 1 wherein the amount of nitrogen dioxide, based on the alcohol groups oxidized and totalled over the reaction time, is present in a quantity of 3 mole equivalents to 50 mole equivalents per mole equivalent of primary alcohol groups.

4. The process as claimed in claim 1 wherein the fluidizing medium is recirculated.

5. The process as claimed in claim 1 wherein the fluidizing medium contains a gaseous-oxygen-transferring oxidizing agent, and optionally an inert gas.

6. The process as claimed in claim 5, wherein the concentration of nitrogen dioxide in the gas is 10% by volume to 98% by volume.

7. The process as claimed in claim 4, wherein the gas fluidizing medium is re-oxidized to form $NO_2$ by addition of a gaseous oxygen-transferring oxidizing agent to the fluidizing medium.

8. The process as claimed in claim 1 operated at a pressure of 0.8 bar to 9 bar.

9. The process as claimed in claim 1 wherein the polysaccharide comprises at least one starch selected from the group consisting of potato starch, wheat starch, corn starch and tapioca starch.

10. The process as claimed in claim 1 carried out over a time period that, on a statistical average, at least 15 mole-% of the oxidation product consists of oxidized anhydroglucose units of the formula:

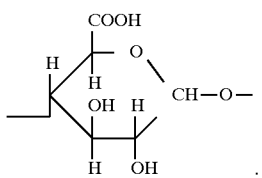 (I)

11. The process as claimed in claim 10, wherein at least 25 mole-% of oxidized anhydroglucose units of the formula I are present in the molecule.

12. The process of claim 2 wherein at least 25% of the primary alcohol groups of the polysaccharide are converted to carboxyl groups.

13. The process of claim 3 wherein the amount of nitrogen dioxide is from 4 to 20 mole equivalents per mole equivalent of primary alcohol groups reacted.

14. The process of claim 5 wherein the fluidizing medium contains nitrogen.

15. The process of claim 6 wherein the concentration of nitrogen dioxide in the gas is 20% by volume to 90% by volume.

16. The process of claim 8 operated at a pressure of 1 bar to 3 bars.

17. The process of claim 11 wherein at least 35 mole % of oxidized anhydroglucose units of the formula I are present in the molecule.

18. The process of claim 5 containing oxygen and nitrogen.

19. The process of claim 5 wherein the fluidizing medium is recirculated over a catalyst for formation of nitrogen dioxide maintained under conditions to form nitrogen dioxide.

20. The process of claim 1 which further comprises reacting the carboxylic acid with a neutralizing agent.

* * * * *